United States Patent
Vangala et al.

(10) Patent No.: US 9,807,673 B2
(45) Date of Patent: Oct. 31, 2017

(54) CELLULAR NETWORK CAPABILITIES EXCHANGE PROTOCOL

(71) Applicant: Apple Inc., Cupertino, CA (US)

(72) Inventors: Sarma V. Vangala, San Jose, CA (US); Tarik Tabet, Los Gatos, CA (US); Swaminathan Balakrishnan, Santa Clara, CA (US); Deepankar Bhattacharjee, Milpitas, CA (US); Xiantao Sun, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/016,651

(22) Filed: Feb. 5, 2016

(65) Prior Publication Data

US 2017/0064610 A1    Mar. 2, 2017

Related U.S. Application Data

(60) Provisional application No. 62/209,856, filed on Aug. 25, 2015.

(51) Int. Cl.
*H04W 48/10* (2009.01)
*H04W 84/04* (2009.01)

(52) U.S. Cl.
CPC .......... *H04W 48/10* (2013.01); *H04W 84/042* (2013.01)

(58) Field of Classification Search
CPC ............. H04W 48/12; H04W 36/0005; H04W 36/0061; H04W 28/18; H04W 48/08; H04W 48/10; H04W 48/16; H04W 52/0216; H04L 1/08
See application file for complete search history.

(56) References Cited

U.S. PATENT DOCUMENTS

| | | | |
|---|---|---|---|
| 9,094,899 B2* | 7/2015 | Smith et al. | H04W 48/17 |
| 9,629,046 B2* | 4/2017 | Hapsari et al. | H04W 36/08 |
| 2008/0267309 A1* | 10/2008 | Saini et al. | H04W 48/10 375/267 |
| 2009/0109878 A1 | 4/2009 | Liu et al. | |
| 2011/0019615 A1* | 1/2011 | Krco et al. | H04W 48/12 370/328 |
| 2011/0255486 A1* | 10/2011 | Luo et al. | H04W 48/12 370/329 |
| 2014/0003254 A1 | 1/2014 | Andreoli-Fang et al. | |
| 2014/0334372 A1* | 11/2014 | Vos | H04W 48/10 370/312 |
| 2015/0156710 A1 | 6/2015 | Montemurro et al. | |
| 2015/0223148 A1* | 8/2015 | Shi et al. | H04W 48/10 370/312 |
| 2016/0007272 A1 | 1/2016 | McCann et al. | |

\* cited by examiner

*Primary Examiner* — Liton Miah
(74) *Attorney, Agent, or Firm* — Meyertons Hood Kivlin Kowert & Goetzel, P.C.; Jeffrey C. Hood

(57) ABSTRACT

This disclosure relates to techniques for enabling a cellular network to more efficiently announce special network capabilities to UE's in its coverage area. The special network capabilities may be specific to a first class of UE devices and/or may be outside of the relevant telecommunication standard used by the cellular network. The base station may transmit a dummy System Information Block-1 (SIB-1), wherein the dummy system information block is broadcast separately from regular system information block 1's (SIB-1's).

20 Claims, 7 Drawing Sheets

CELLULAR NETWORK CAPABILITIES EXCHANGE PROTOCOL

PRIORITY CLAIM

The present application claims benefit of priority to provisional application 62/209,856 titled "Cellular Network Capabilities Exchange Protocol" and filed on Aug. 25, 2015, which is hereby incorporated by reference in its entirety as though fully and completely set forth herein.

FIELD

The present application relates to wireless devices, including to apparatuses, systems and methods for cellular networks and user equipment devices to exchange network capability information.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. In some cellular network systems, the cellular network may offer special capabilities to at least some of the UEs, e.g., to a certain class of UEs. For example, some networks may utilize cellular communication techniques which take into account different application characteristics of the various applications utilizing cellular communication for more efficient operation. In some instances the network (e.g., a base station) may need to announce that it offers certain capabilities to UEs in its coverage area. However, these announcements can consume network resources and thus add to overhead in network operation. Accordingly, improvements in the field would be desirable.

SUMMARY

Embodiments are presented herein of apparatuses, systems, and methods for announcing the presence of special capabilities of a cellular network with reduced overhead. The special network capabilities may be specific to a first class of UE devices and/or may be outside of the relevant telecommunication standard used by the cellular network.

In at least some embodiments, a cellular base station may transmit a dummy system information block comprising network capability notification information in a cell served by the cellular base station. The network capability notification information may indicate that the cellular network supports a first network capability useable only by a first class of user equipment (UE) devices. Alternatively, or in addition, the network capability notification may indicate that the cellular network supports a first network capability that is outside of the first telecommunication standard used in the cellular network. The dummy system information block may be broadcast separately from system information block 1's (SIB-1 's) broadcast in the network. Stated another way, the cellular base station may broadcast a plurality of system information block 1's (SIB-1's) in the cell, wherein the SIB- 1 's do not contain the network capability notification information. One or more UEs in the cellular network may receive and decode the dummy system information block, and as a result may utilize the first network capability of the cellular network.

The techniques described herein may be implemented in and/or used with a number of different types of devices, including but not limited to cellular base stations, mobile management entities (MMEs) and other cellular core network entities, as well as user equipment devices such as mobile phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
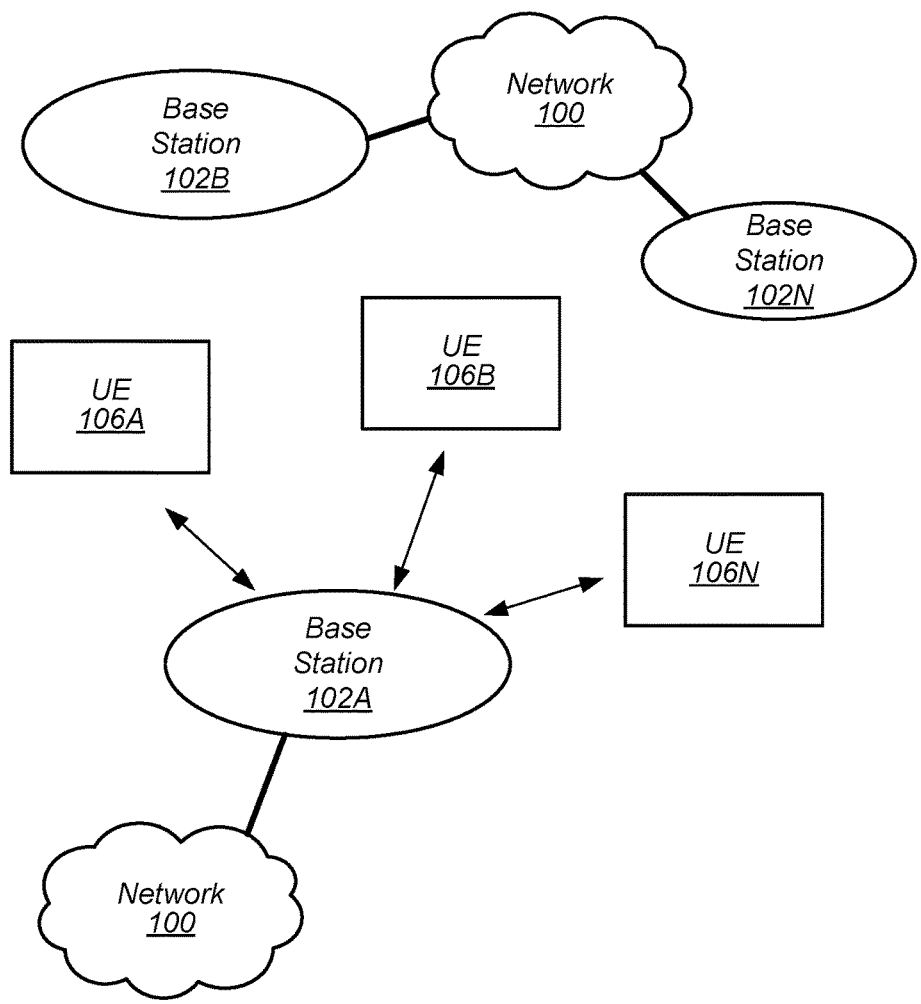
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System UTRAN: UMTS Terrestrial Radio Access Network or Universal Terrestrial Radio Access Network LTE: Long Term Evolution RAN: Radio Access Network E-UTRAN: Evolved UMTS Radio Access Network or Evolved Universal Radio Access Network EPC: Evolved Packet Core EPS: Evolved Packet Service MME: Mobility Management Entity HSS: Home Subscriber Server AS: Access Stratum NAS: Non-Access Stratum RLC: Radio Link Control RRC: Radio Resource Control MAC: Media Access Control IE: Information Element NW: Network SI: System Information SIB: System Information Bloc SIB-1 : System Information Block 1

RNTI: Radio Network Temporary Identifier

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a cellular network device or a user equipment. Processing elements include, for example: processors and associated memory, portions or circuits of individual processor cores, entire processor cores, individual processors, circuits such as an ASIC (Application Specific Integrated Circuit), programmable hardware elements such as a field programmable gate array (FPGA), as well any of various combinations thereof.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
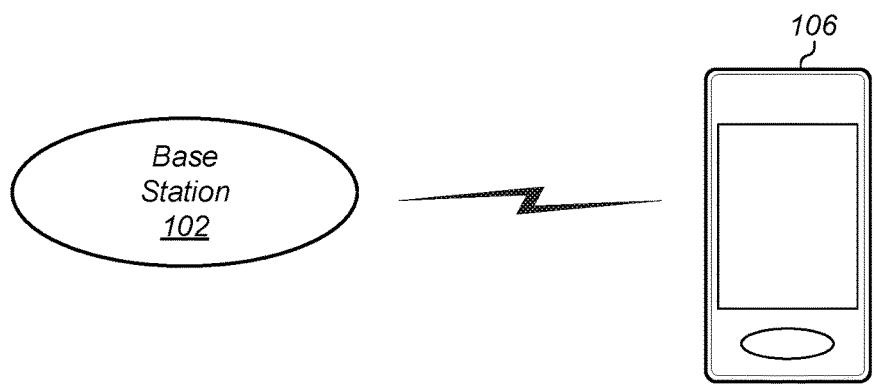
FIG. 2 illustrates a base station (BS) in communication with a user equipment (UE) device, according to some embodiments.
Figure 3:
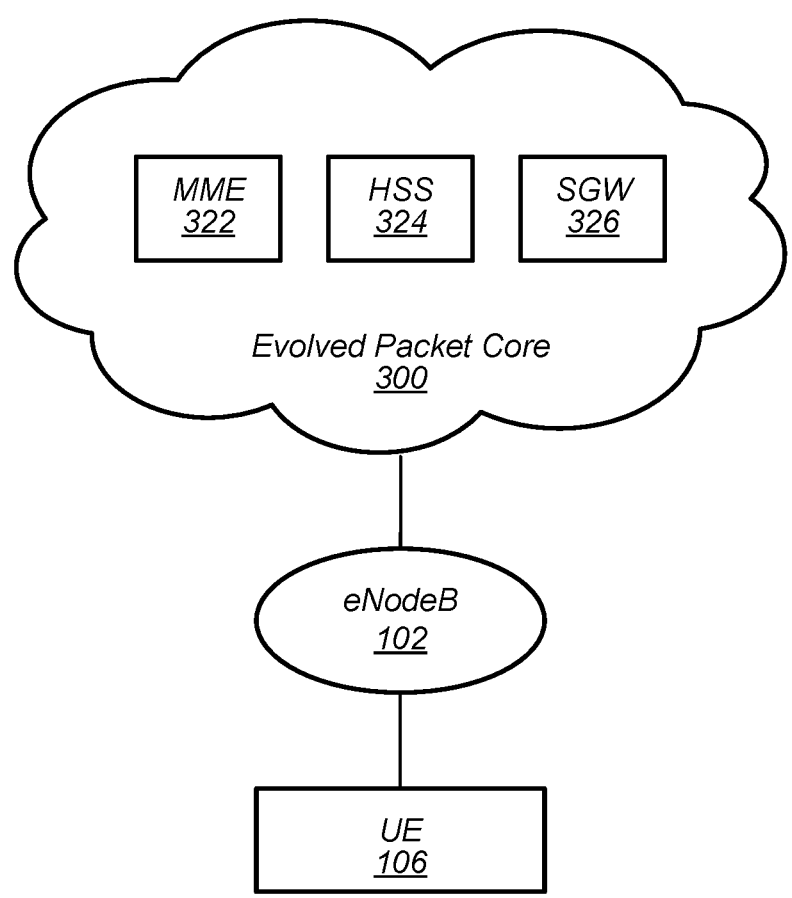
FIG. 3 illustrates an exemplary (and simplified) cellular network architecture, according to some embodiments.

FIGS. 1-3—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, an evolved packet core, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a computer or a tablet, or virtually any type of wireless device.

The base station 102 may include a processing element. For example, the base station 102 may include a processor that is configured to execute program instructions stored in memory. The base station 102 may perform any of the method embodiments described herein by executing such stored instructions. Alternatively, or in addition, the base station 102 may include a programmable hardware element such as an FPGA (field-programmable gate array) that is configured to perform any of the method embodiments described herein, or any portion of any of the method embodiments described herein.

The UE 106 may also include a processing element. For example, the UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless communication system, such as a 3GPP compliant cellular network, according to some embodiments.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 300. As shown, the EPC 300 may include mobility management entity (MME) 322, home subscriber server (HSS) 324, and serving gateway (SGW) 326. The EPC 300 may include various other devices and/or entities known to those skilled in the art as well. Any of the cellular network devices shown in FIG. 3, such as the eNodeB 102, or the devices in the EPC 300, such as MME 322, HSS 324, or SGW 326, may perform a portion or all of the methods described herein.

Figure 4:
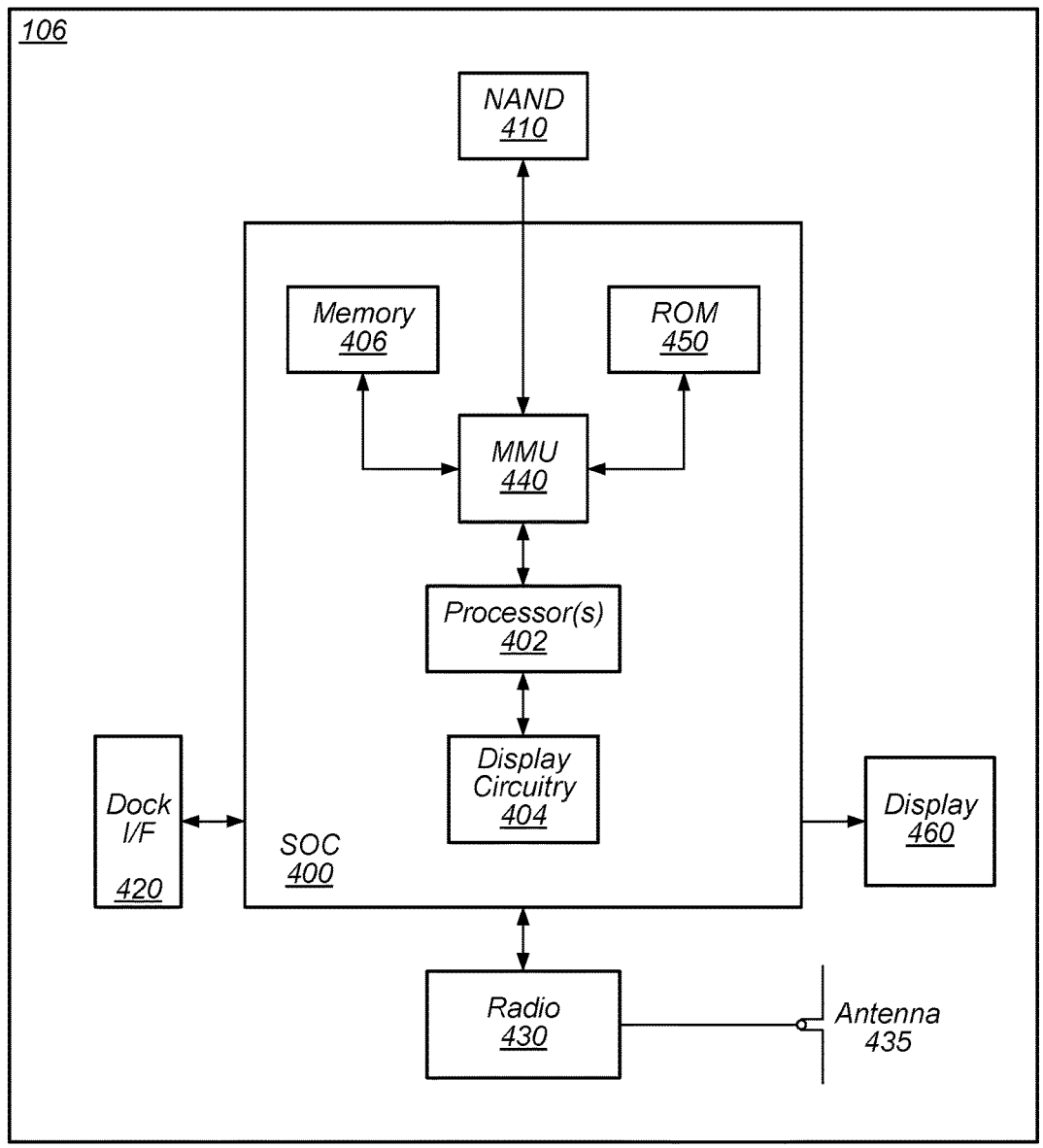
FIG. 4 illustrates an exemplary block diagram of a UE, according to some embodiments.

FIG. 4—Exemplary Block Diagram of a UE

FIG. 4 illustrates an exemplary block diagram of a UE 106, according to some embodiments. As shown, the UE 106 may include a processing element, here shown as a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including Flash 410), a connector interface 420 (e.g., for coupling to a computer system, dock, charging station, etc.), the display 460, and wireless communication circuitry 430 (e.g., for LTE, CDMA2000, Bluetooth, Wi-Fi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

As described further subsequently herein, the UE 106 may include a processing element, which may include hardware and software components, for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
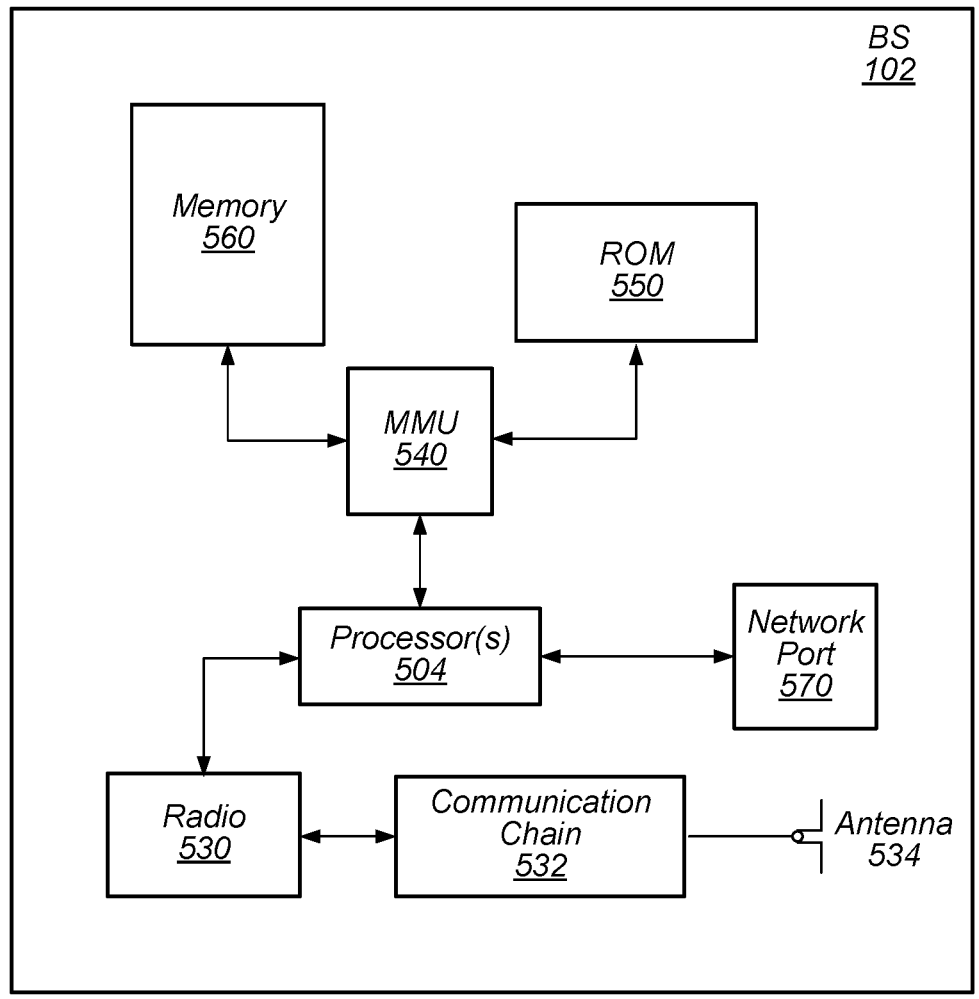
FIG. 5 illustrates an exemplary block diagram of a BS, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include a processing element, such as processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, LTE, LTE-A, GSM, WCDMA, CDMA2000, Wi-Fi, etc.

The processing element, e.g., processor(s) 504, of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
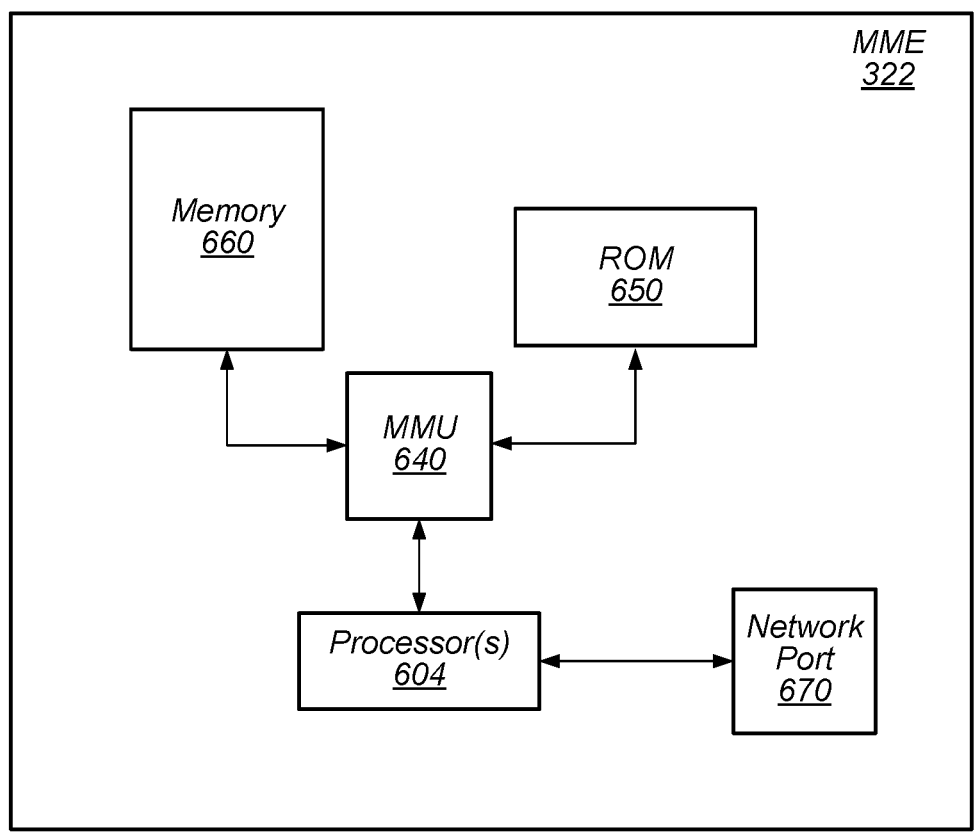
FIG. 6 illustrates an exemplary block diagram of an MME, according to some embodiments.

FIG. 6—Mobility Management Entity

FIG. 6 illustrates an exemplary block diagram of a mobility management entity (MME) 322, according to some embodiments. It is noted that the MME 322 of FIG. 6 is merely one example of a possible MME 322. As shown, the MME 322 may include a processing element, such as processor(s) 604 which may execute program instructions for the MME 322. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The MME 322 may include at least one network port 670. The network port 670 may be configured to couple to one or more base stations and/or other cellular core network entities and/or devices.

The MME 322 may provide mobility related services to a plurality of devices, such as UE devices 106. For example, the MME 322 may be responsible for registering UE devices which attempt to perform an attach procedure, a tracking area update procedure, and/or any of various other procedures.

The MME 322 may communicate with base stations (e.g., eNBs) and/or other core network entities/devices by means of any of various communication protocols and/or interfaces. As one example, in a 3GPP context, the MME 322 may use any of an S1-MME, S3, S10, S11, S6a, and/or any of various other communication protocols or interfaces to communicate with other cellular network components.

The processing element, such as processor(s) 604, of the MME 322 may be configured to implement part or all of the methods described herein, e.g., by executing program instructions stored on a memory medium (e.g., a non-transitory computer-readable memory medium). Alternatively, the processing element may be configured as a programmable hardware element, such as an FPGA (Field Programmable Gate Array), or as an ASIC (Application Specific Integrated Circuit), or a combination thereof.

System Information Signaling

In some telecommunications standards, such as LTE, the first step for a UE device wishing to access a cell after cell search/cell acquisition may be decoding of the master information block (MDB) and the system information block(s) (SIBs) of the cell to which access is desired. The MDB may typically be transmitted by the cellular network (base station) on the physical broadcast channel (PBCH), and may include information such as system bandwidth, system frame number (SFN), physical HARQ indicator channel (PHICH) configuration, and the number of transmit antennas used by the system.

The SIBs are also transmitted by the cellular network and may typically be mapped onto radio resource control (RRC) system information messages transmitted on the physical downlink shared channel (PDSCH). SIBs may include a variety of information, such as that related to cell access, various cell re-selection procedures, etc. Therefore, in order to establish a connection to a cell or camp on a cell, the UE may be required to decode system information (SI) broadcast as system information blocks (SIB's).

One type of SIB referred to as SIB-1 contains information useable by the UE in evaluating if the UE is allowed to access a cell. SIB-1 contains cell access related information (e.g. a PLMN identity list, tracking area code, cell identity, etc.), information for cell selection (e.g. minimum required Rx level in the cell and offset), p-Max, frequency band indicator, scheduling information, TDD configuration, SI-window length and system information value tag, as well as other information. In particular, SIB-1 supplies the UE with the scheduling of other system information (other SIBs).

Announcing Special Network Capabilities—Problems

As noted above, in some instances a cellular network may offer certain special capabilities, which may only be useable by a certain class of UE devices. Alternatively, or in addition, the special capabilities that are offered may be outside of the relevant telecommunications standard used in the cellular network. In these instances the network may desire to broadcast or announce these special network capabilities to the UE's in its coverage area. In this way, UEs that are of this certain class can become aware that the network offers these special capabilities and can thus take advantage of them.

The 3GPP standard defines certain methodologies to be used for announcements of special network capabilities by networks to UEs. The methodology defined by the 3GPP standard is for the network to create and send a dummy SIB to the UE. These dummy SIBs and any other SIBs being sent by the network are included in SIB-1. The term "dummy SIB" has the full extent of its ordinary meaning, e.g., its meaning as used in the 3GPP standard, and at least includes a system information block that is created and sent by a wireless network to notify UE devices of certain network capabilities.

However, inclusion of such dummy SIBs in SIB-1 is not ideal, or may be problematic, for a number of reasons. First, inclusion of a dummy SIB in SIB-1 may add undesirable overhead to network operations. For example, SIB-1 is sent quite frequently, in general more frequently than is necessary for the special network capabilities announcement to be transmitted, and hence consumes more bandwidth than necessary. Thus sending the dummy SIB to UEs in each SIB-1 results in additional overhead in terms of bytes and periodicity. Further, all UEs, irrespective of whether they support the specialized feature being advertised by the network, are generally required to read the dummy SIB, since it is included in the SIB-1. A non-participating UE will read the dummy SIB and then discard it, since the non-participating UE is not able to take advantage of the advertised capabilities. This adds unnecessary overhead for non-participating UEs. In other words, UEs which lack the ability to use these special capabilities are still required to decode the dummy SIB in SIB-1, resulting in wasted time and resources.

In some extreme cases, some legacy/older UEs following older 3GPP release versions which attempt to read the dummy SIB in SIB-1 can enter a state where their service can be severely impacted, leading to device un-usability issues. In summary, sending these announcement messages in every SIB-1 message adds much more overhead than is necessary and can create problems for certain UEs.

Announcing Special Network Capabilities—Embodiments

Instead, in at least some embodiments described herein, the cellular network is configured to broadcast dummy SIBs that comprise network capability notification information (capability notification messages). Thus the network capability notification information may not be sent in SIB-1 messages, but instead may be sent as separate dummy SIB messages, and hence much less frequently. As used herein, the term "dummy SIB" refers to an information block that is created at least in part for the purpose of transmitting network capability notification information to a class of UE devices.

For example, in some embodiments these dummy SIBs (capability notification messages) may be sent with a regularity of 100s of milliseconds to seconds, or once per RRC Connection, which is much less frequently than SIB-1 or the other SIBs. As another example, these dummy SIBs may be sent with a periodicity of only once or twice every paging cycle. Therefore, in at least some embodiments, instead of inserting the network capability notification information in the SIB-1, the network may transmit a dummy SIB containing the network capability notification information separately and less frequently. In some embodiments, the network and the UE may be configured to coordinate their timing with respect to these dummy SIBs. In other words, the network and the UE may coordinate their timing with respect to when the network transmits the notifications (transmits the dummy SIBs) and when the UEs are configured to "look for" the dummy SIBs.

The above embodiments provide significant advantages. For example, since the dummy SIBs are not included in SIB-1, this avoids the need for other non-participating UEs (UEs not able to take advantage of the special capabilities) to decode these dummy SIBs. Thus non-participating UEs are no longer required to decode dummy SIBs containing information on special capabilities of which they are not able to take advantage.

In at least some embodiments, a pre-configured system frame number (SFN) with a specific periodicity can be pre-agreed upon by (or pre-configured in) the network and the UE for identifying the location of these dummy SIBs (also called "capability notification SIBs"). Alternatively, or in addition, to reduce the periodicities of dummy SIB lookups by the UEs, the network can transmit the SFN information in a paging message (or other type of message) to the respective UE. This provides a more network controlled approach for advertising the location of network capability information. In other words, this provides a more flexible approach to the network in transmitting location information of the dummy Ms. This also provides flexibility to the UE in using the information in the SIB at its own discretion in the sense that the UE can ignore the dummy SIB altogether for power conservation scenarios.

In addition, the dummy SIB itself can be scrambled using a reserved radio network temporary identifier (RNTI). Hence only the UEs which can take advantage of these capabilities, (and which may initiate call flows based on the announcement in the dummy SIB) may be able to read this dummy SIB. This may prevent UEs which are not able to take advantage of these capabilities from being "confused" by the information in the dummy SIB.

Figure 7:
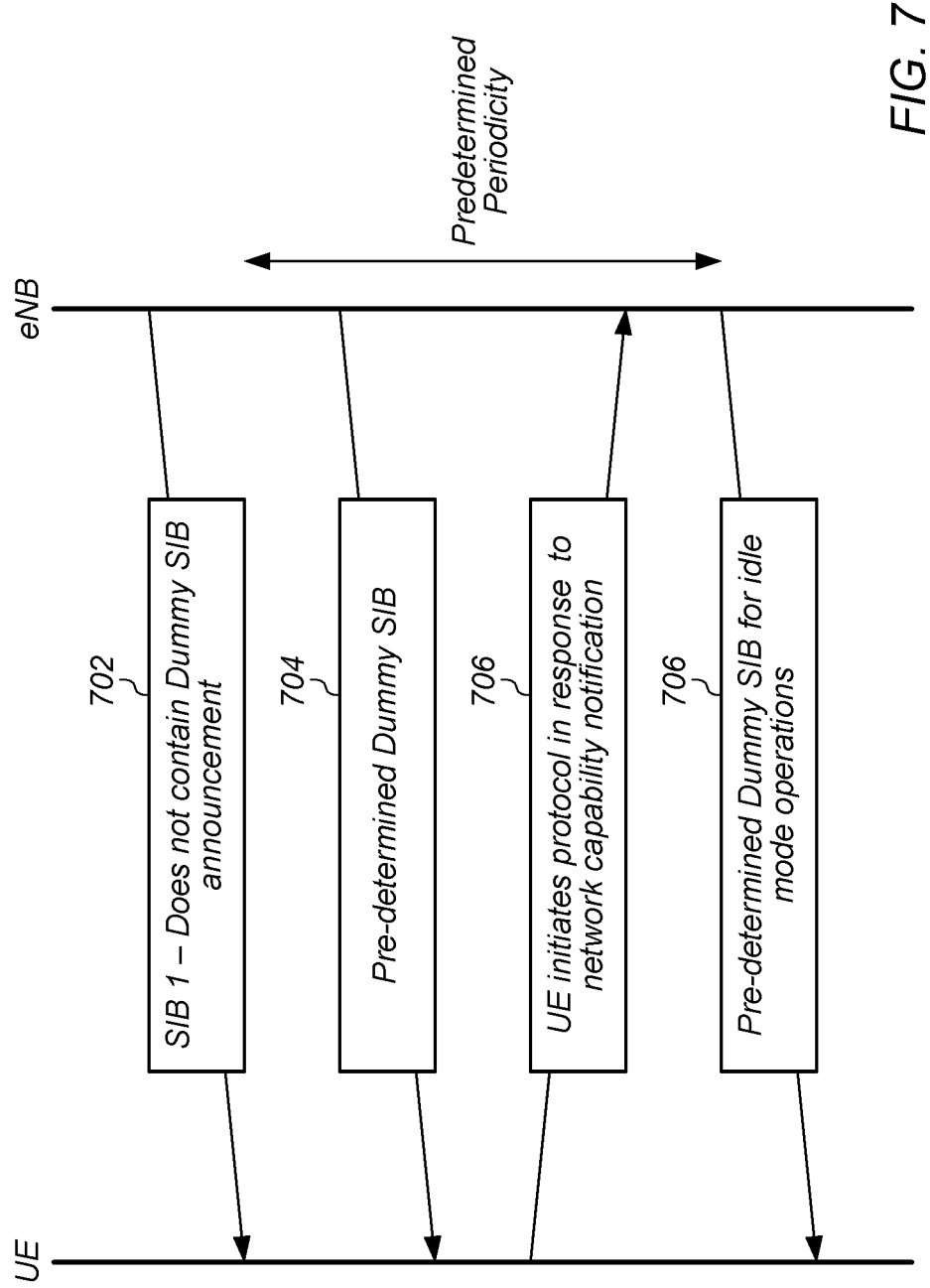
FIG. 7 illustrates a flow diagram of operation of a base station and a UE, according to some embodiments.

FIG. 7—Communication Flow Diagram

FIG. 7 is a communication/signal flow diagram illustrating a scheme or protocol for notification of special network capabilities, according to some embodiments. The method of FIG. 7 may be used to notify a certain class of UEs about special network capabilities that are offered by the cellular network to this certain class of UEs. One example of a "certain class of UEs" is those UEs belonging to a specific UE vendor, such as iPhone® devices offered by Apple®. Another example of a "certain class of UEs" comprises certain accessory devices which may be link budget limited, such as smart watches or other wearable communication devices, which may be specific to a certain vendor.

The method shown in FIG. 7 may be used to announce to UEs, or notify UEs of, any of various types of network capabilities, including capabilities that are specific to a certain class of UEs. The scheme shown in FIG. 7 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

At 702, the base station (eNB) may transmit a SIB-1 to respective UEs. Unlike some prior systems where network capability notifications are included in each SIB-1 message, in this embodiment the SIB-1 does not contain such network capability notifications. As discussed above, this obviates the necessity of non-capable devices having to decode these network capability notifications.

At 704 the base station (eNB) may transmit a dummy SIB to the UE at a pre-determined location in the channel. The dummy SIB may also be referred to as a capability notification information block (CNIB). The dummy SIB may contain network capability notification information, i.e., information that notifies a UE or class of UEs that the cellular network supports certain specific capabilities. The pre-determined location of the dummy SIB may take the form of a pre-determined sequence frame number (SFN).

In one embodiment, the base station may have been pre-configured with a specific SFN and periodicity in which the network will broadcast these dummy SIBs. For example, participating UEs (UEs that can take advantage of these special capabilities) may receive this SFN and periodicity information in software updates.

Figure 8:
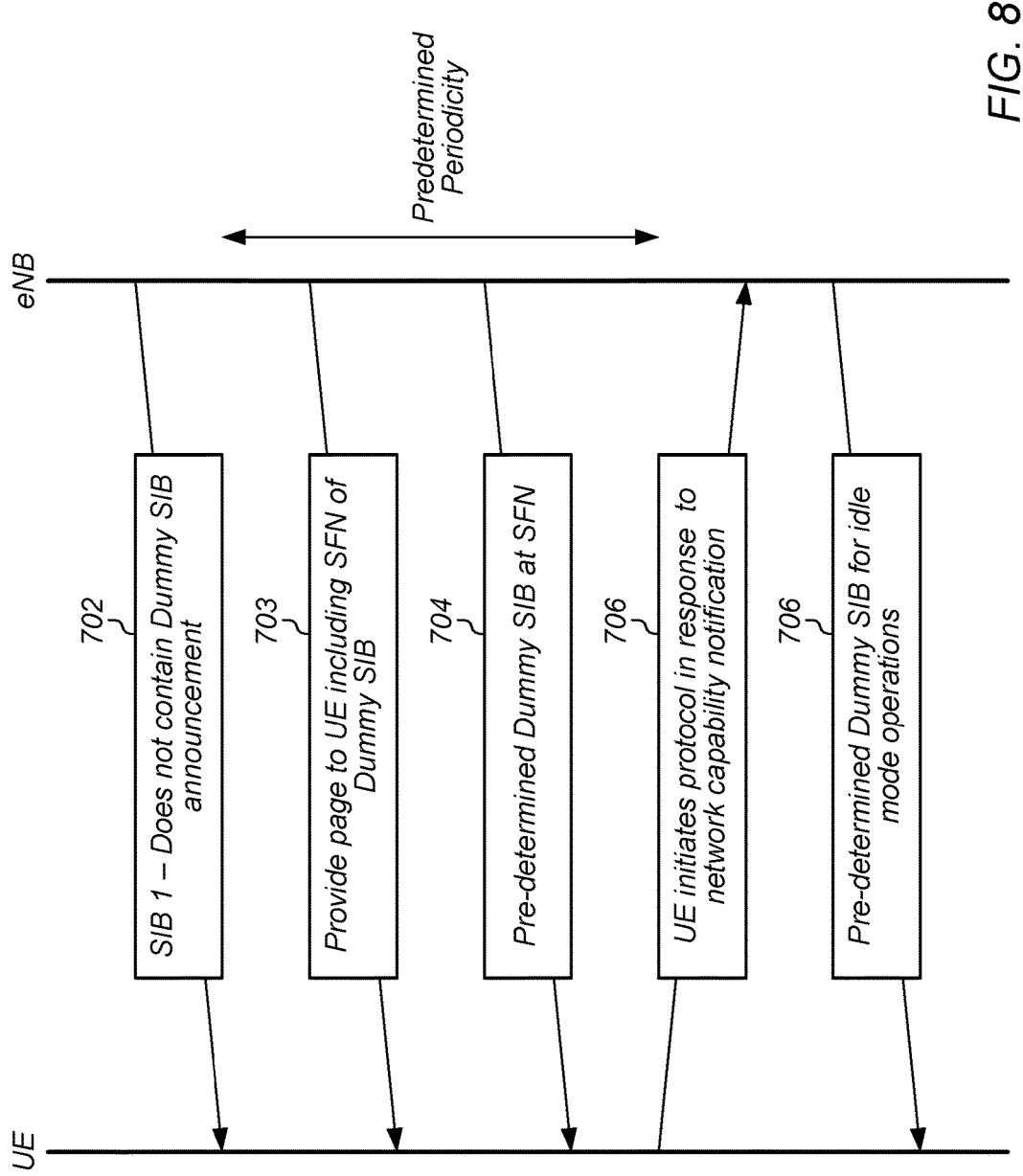
FIG. 8 illustrates a flow diagram of operation of a base station and a UE, according to some embodiments.

In another embodiment, as shown in FIG. 8, the base station may have previously transmitted the pre-determined location (the SFN) of the dummy SIB to the UE in paging messages that are sent to the UE (703 of FIG. 8). The use of paging messages to send dummy SIB location information may allow for the transmission of this location information at intervals such as every 1 or 2 paging cycles. The base station may also or instead transmit the SFN information of the dummy SIBs in other types of messages.

As noted above, in some embodiments the dummy SIB may be scrambled based on a RNTI (radio network temporary identifier), which may prevent non-capable or non-participating UEs from decoding the dummy SIB information.

At 706, in response to the UE receiving and decoding the dummy SIB, the UE may initiate a protocol that uses or takes advantage of the special capability indicated in the dummy SIB. As one example, if the special capability enables the UE to adjust its communication operations based on its currently executing software applications, the UE may adjust its communication operations accordingly, e.g., may perform application aware communication scheduling. The methods described herein may be used to announce or provide notification of any of various types of special network capabilities.

The base station may be configured to transmit the dummy SIB in either a periodic or aperiodic manner. This allows new UEs entering the cell or coverage area of the base station to receive a dummy SIB (the network capability notification) fairly soon after entering the cell. As shown in FIG. 7, if the base station broadcasts the dummy SIB when the UE is in idle mode at 708, the UE may be configured to wake up at the pre-determined SFN to receive and decode the dummy SIB before returning back to idle mode.

An additional exemplary set of embodiments may include a wireless user equipment (UE) device, comprising: a radio; and a processing element operably coupled to the radio; wherein the UE is configured to implement any of the method elements of any of the preceding examples.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

The following numbered paragraphs describe additional embodiments:

An apparatus for use in a cellular network device may comprise: a processing element, wherein the processing element is configured to: generate communication with a plurality of user equipment devices operating in a cell according to a first radio access technology (RAT) operating according to a first telecommunication standard; generate a dummy system information block comprising network capability notification information for broadcast in the cell, wherein the network capability notification information indicates that the cellular network device supports a first network capability that is outside of the first telecommunication standard; and receive communication from a first UE of the plurality of UE devices, wherein the communication utilizes the first network capability of the cellular network, wherein the communication from the first UE is received in response to receipt by the first UE of the network capability notification information in the dummy system information block.

In the preceding apparatus, the dummy system information block may be broadcast separately from system information block 1's (SIB-1's).

In the preceding apparatus, the apparatus may be further configured to: generate a plurality of system information block 1's (SIB-1's) for broadcast in the cell, wherein none of the SIB-1's contain the network capability notification information.

An apparatus for use in a user equipment (UE) device, may comprise: a processing element, wherein the processing element is configured to: generate communication with a cellular network according to a first radio access technology (RAT) operating according to a first telecommunication standard; receive a dummy system information block comprising network capability notification information broadcast by a cellular base station in the cellular network, wherein the network capability notification information indicates that the cellular network supports a first network capability that is outside of the first telecommunication standard; and generate communication that utilizes the first network capability of the cellular network, wherein the communication is generated by the first UE in response to receipt by the first UE of the network capability notification information in the dummy system information block.

In the preceding apparatus, the dummy system information block may be received separately from system information block 1's (SIB-1's).

In the preceding apparatus, the apparatus may be further configured to: receive a plurality of system information block 1's (SIB-1's) broadcast by the cellular base station in the cellular network, wherein none of the SIB-1's contain the network capability notification information.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a cellular base station (BS) in a cellular network:
broadcasting a dummy system information block comprising network capability notification information in a cell served by the cellular base station, wherein the network capability notification information indicates that the cellular network supports a first network capability useable only by a first class of user equipment (UE) devices, wherein the dummy system information block is broadcast separately from system information block 1's (SIB-1's); and
receiving communication from a first UE of the first class of UE devices, wherein the communication utilizes the first network capability of the cellular network, wherein the communication from the first UE is received in response to receipt by the first UE of the network capability notification information in the dummy system information block.

2. The method of claim 1, further comprising:
by the cellular base station in the cellular network:
broadcasting a plurality of system information block 1's (SIB-1's) in the cell, wherein the SIB-1's do not contain the network capability notification information.

3. The method of claim 1, further comprising:
by the cellular base station in the cellular network:
prior to broadcasting the network capability notification information in the dummy system information block, transmitting a paging message to the first UE, wherein the paging message indicates a time of the dummy system information block in a communication channel;

wherein the time of the dummy system information block is useable by the first UE to locate the dummy system information block in the communication channel.

4. The method of claim 3, wherein the time is specified by a sequence frame number.

5. The method of claim 1, wherein said broadcasting the network capability notification information in the dummy system information block is performed at a pre-determined time in a communication channel, wherein the pre-determined time is known by the base station and the first UE.

6. The method of claim 1,
wherein the base station is configured to communicate with a plurality of user equipment devices according to a first radio access technology (RAT) operating according to a first telecommunication standard;
wherein the network capability notification information indicates that the cellular network supports a first network capability that is outside of the first telecommunication standard.

7. The method of claim 1,
wherein said broadcasting comprises scrambling the network capability notification information in the dummy system information block based on a radio network temporary identifier (RNTI);
wherein the scrambled network capability notification information is not readable by UE's that are not of the first class of UE devices.

8. A cellular base station, comprising:
at least one antenna;
a radio coupled to the at least one antenna; and
a processing element communicatively coupled to the radio;
wherein the base station is configured to communicate with a plurality of user equipment devices according to a first radio access technology (RAT) operating according to a first telecommunication standard;
wherein the cellular base station is configured to:
broadcast, using the first telecommunication standard, a dummy system information block comprising network capability notification information in a cell served by the cellular base station, wherein the network capability notification information indicates that the cellular network supports a first network capability that is outside of the first telecommunication standard; and
receive communication from a first UE of the plurality of UE devices, wherein the communication utilizes the first network capability of the cellular network, wherein the communication from the first UE is received in response to receipt by the first UE of the network capability notification information in the dummy system information block.

9. The cellular base station of claim 8,
wherein the dummy system information block is broadcast separately from system information block 1's (SIB-1's).

10. The cellular base station of claim 8,
wherein the cellular base station is further configured to:
broadcast a plurality of system information block 1's (SIB-1's) in the cell, wherein none of the SIB-1's contain the network capability notification information.

11. The cellular base station of claim 8,
wherein the cellular base station is configured to:
prior to broadcasting the network capability notification information in the dummy system information block, transmit a paging message to the first UE, wherein the paging message indicates a time of the dummy system information block in a communication channel;
wherein the time of the dummy system information block is useable by the first UE to locate the dummy system information block in the communication channel.

12. The cellular base station of claim 11,
wherein the time is specified by a sequence frame number.

13. The cellular base station of claim 8,
wherein said broadcasting the network capability notification information in the dummy system information block is performed at a pre-determined time in a communication channel, wherein the pre-determined time is known by the base station and the first UE.

14. The cellular base station of claim 8,
wherein the network capability notification information is useable only by a first class of user equipment (UE) devices.

15. The cellular base station of claim 8,
wherein the first class of user equipment (UE) devices comprises UE devices which are link budget limited.

16. A user equipment (UE) device, comprising:
at least one antenna;
a radio coupled to the at least one antenna; and
a processing element communicatively coupled to the radio;
wherein the UE device is configured to communicate with a cellular network according to a first radio access technology (RAT) operating according to a first telecommunication standard;
wherein the UE device is configured to:
receive a dummy system information block comprising network capability notification information, wherein the dummy system information block is received from the cellular network, wherein the network capability notification information indicates that the cellular network supports a first network capability that is outside of the first telecommunication standard;
generate communication to the cellular network, wherein the communication utilizes the first network capability of the cellular network, wherein the communication from the first UE is generated in response to receipt by the first UE of the network capability notification information in the dummy system information block.

17. The UE device of claim 16,
wherein the dummy system information block is separate from system information block 1's (SIB-1's) received from the base station.

18. The UE device of claim 16,
wherein the UE device is further configured to:
receive a plurality of system information block 1's (SIB-1's) from the base station, wherein none of the SIB-1's contain the network capability notification information.

19. The UE device of claim 16,
wherein the UE is of a first class of user equipment (UE) devices that are link budget limited.

20. The UE device of claim 16,
wherein the UE is a smart watch.

* * * * *